United States Patent
Atarashi (10) Patent No.: US 8,604,739 B2
(45) Date of Patent: Dec. 10, 2013

(54) VECTOR CONTROL FOR AN AXIAL GAP MOTOR

(75) Inventor: Hirofumi Atarashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 872 days.

(21) Appl. No.: 12/525,802

(22) PCT Filed: Feb. 26, 2008

(86) PCT No.: PCT/JP2008/053279
§ 371 (c)(1),
(2), (4) Date: Aug. 4, 2009

(87) PCT Pub. No.: WO2008/129904
PCT Pub. Date: Oct. 30, 2008

(65) Prior Publication Data
US 2010/0026216 A1    Feb. 4, 2010

(30) Foreign Application Priority Data
Apr. 13, 2007  (JP) .................. 2007-105560

(51) Int. Cl.
*H02P 1/00* (2006.01)
*H02P 3/00* (2006.01)
*H02P 7/06* (2006.01)

(52) U.S. Cl.
USPC . 318/494; 318/720; 318/400.01; 318/400.02; 318/400.27; 310/112; 310/268; 310/156.35; 310/180; 310/192

(58) Field of Classification Search
USPC .......... 318/494, 720, 400.01, 400.02, 400.27; 310/112, 268, 156.35, 180, 181, 192
See application file for complete search history.

(56) References Cited

U.S. PATENT DOCUMENTS

| | | | |
|---|---|---|---|
| 4,081,726 A * | 3/1978 | Brimer et al. .................. | 318/751 |
| 5,656,911 A | 8/1997 | Nakayama et al. | |
| 5,864,197 A | 1/1999 | Naito et al. | |
| 6,049,149 A | 4/2000 | Lin et al. | |
| 7,608,965 B2 * | 10/2009 | Aydin et al. .............. | 310/156.32 |
| 7,659,686 B2 * | 2/2010 | Osada et al. .................. | 318/771 |
| 7,852,039 B2 * | 12/2010 | Kinpara et al. ............... | 318/778 |
| 2004/0070307 A1 | 4/2004 | Haugan et al. | |
| 2007/0046124 A1 | 3/2007 | Aydin et al. | |

FOREIGN PATENT DOCUMENTS

| | | |
|---|---|---|
| EP | 1 508 955 A1 | 2/2005 |
| JP | 02-159950 A | 6/1990 |
| JP | 05-236714 A | 9/1993 |
| JP | 06-233511 A | 8/1994 |
| JP | 08-331705 | * 12/1996 |

(Continued)

*Primary Examiner* — Erick Glass
(74) *Attorney, Agent, or Firm* — Arent Fox LLP (57) ABSTRACT

A controller for an axial gap-type motor (3) comprises a rotor (11) having a permanent magnet and a first stator (12a) and a second stator (12b) opposed to each other with the rotor (11) interposed therebetween in the axial direction of revolution of the rotor (11). The controller further includes an electrification control portion which supplies a torque current (Iq) for generating a magnetic field to revolve the rotor (11) to an armature winding (13a) of the first stator (12a) and supplies a field current (+Id) for reinforcing the magnetic flux by the permanent magnet of the rotor (11) or a field current (−Id) for weakening the magnetic flux to an armature winding (13b) of the second stator (12b). Consequently, the controllable range of the motor is increased and the axial gap-type motor can be operated at higher velocity and higher torque.

8 Claims, 6 Drawing Sheets

(56) References Cited

FOREIGN PATENT DOCUMENTS

| | | |
|---|---|---|
| JP | 8-331705 A | 12/1996 |
| JP | 10-271784 A | 10/1998 |
| JP | 11-332277 A | 11/1999 |
| JP | 2000-4600 A | 1/2000 |
| JP | 2001-136721 A | 5/2001 |
| JP | 2002-369467 A | 12/2002 |
| WO | WO 2005/093943 A1 | 10/2005 |

* cited by examiner

VECTOR CONTROL FOR AN AXIAL GAP MOTOR

BACKGROUND OF THE INVENTION

1. Field of the Invention

The present invention relates to a controller for an axial gap-type motor.

2. Description of the Related Art

Conventionally, there has been known an axial gap-type motor provided with a rotor having a permanent magnet, two stators disposed at both sides of the rotor in an axial direction of revolution of the rotor, and an armature attached to each of the stators (for example, refer to Japanese Patent Laid-open No. H10-271784 and No. 2001-136721). According to the axial gap-type motor, it is possible to obtain a relatively high output torque although the rotor thereof is getting shorter in the axial direction.

According to the conventional axial gap-type motor, the leak of a magnetic flux generated by an armature winding of the stator is reduced according to an electrification control by electrifying armature windings of both stators disposed at both sides of the rotor, and therefore, it is possible to increase the output torque of the motor.

However, when the output torque of the axial gap-type motor is increased, a revolution number thereof will be increased; consequently, an induced voltage between terminals of the motor will become greater, a difference between the induced voltage and an applied voltage to the armature winding becomes less. Therefore, an electric current which can be supplied to the motor is reduced, causing the motor to go out of control.

SUMMARY OF THE INVENTION

The present invention has been accomplished in view of the aforementioned problems, and it is therefore an object of the present invention to provide a controller for an axial gap-type motor capable of being operated at higher revolutional velocity with higher output torque by increasing a controllable range thereof.

To attain an object described above, the controller for the axial gap-type motor according to the present invention comprising: a rotor having a permanent magnet; and a first stator and a second stator oppositely disposed in an axial direction of revolution of the rotor with the rotor interposed therebetween further includes an electrification control portion configured to supply a torque current for generating a magnetic field to revolve the rotor to an armature winding of the first stator and a field current for reinforcing a magnetic flux or a field current for weakening the magnetic flux generated by the permanent magnet of the rotor to an armature winding of the second stator.

According to the present invention, the electrification control portion increases an upper limit of the controllable range of the output torque of the motor by supplying the field current for reinforcing the magnetic flux generated by the permanent magnet of the rotor to the armature winding of the second stator while supplying the torque current the armature winding of the first stator to revolutionarily drive the rotor. Moreover, by supplying the field current for weakening the magnetic flux generated by the permanent magnet of the rotor to the armature windings of the second stator, an induced voltage between the terminals of the armature windings of the first stator, and consequently, increasing the upper limit of the controllable range of the output torque of the motor.

In the present invention, the electrification control portion converts the motor into an equivalent circuit in a d-q coordinate system of direct currents of two phases having an armature at d axis (d-axial armature) along the field direction of the rotor and an armature at q axis (q-axial armature) orthogonal to the d axis, and supplies an electric current to the armature winding at the q axis as the torque current and an electric current to the armature winding at the d axis as the field current.

According to the present invention, the d-axial armature and the q-axial armature are physically separated, therefore, the first stator can be favorably configured to output the torque and the second stator can be favorably configured to reinforce and weaken the magnetic field. According thereto, by configuring the first stator and the second stator separately, the operation efficiency of the motor can be improved in a whole.

In the present invention, the electrification control portion supplies the field current to the armature winding of the second stator to generate a magnetic flux for reinforcing the magnetic flux generated by the permanent magnet on a condition when a required output torque of the motor is equal to or greater than a defined value.

According to the present invention, when a required output torque of the motor is equal to or greater than the defined value, the field current for reinforcing the magnetic flux generated by the permanent magnet of the rotor is supplied to the armature winding of the second stator by the electrification control portion. According thereto, the magnetic flux in a gap between the rotor and the first stator is reinforced, and consequently, the output torque of the motor can be increased.

In the present invention, the controller for the motor further includes a terminal voltage detection portion configured to detect a terminal voltage of the armature winding of the first stator, wherein the electrification control portion supplies the field current to the armature winding of the second stator to generate a magnetic flux to weaken the magnetic flux generated by the permanent magnet of the rotor on a condition when the terminal voltage of the armature winding of the first stator is equal to or greater than a defined value as the rotor is revolving.

According to the present invention, when the terminal voltage of the armature winding of the first stator is equal to or greater than the defined value as the rotor is revolving, the field current for generating the magnetic flux to weaken the magnetic flux generated by the permanent magnet of the rotor is supplied to the armature winding of the second stator by the electrification control portion. According thereto, the magnetic flux in the gap between the rotor and the first stator is weakened, and consequently, the terminal voltage of the armature winding of the first stator can be prevented from rising, and the supply of the torque current from the power drive circuit of the first stator to the armature winding of the first stator is maintained available.

In the present invention, the controller for the motor further includes a switcher configured to switch the armature winding of the second stator and a power drive circuit of the armature winding of the second stator between a connected state and a disconnected state, wherein the switcher switches the armature winding of the second stator and the power drive circuit of the armature winding of the second stator to the disconnected state on a condition when no field current is supplied by the electrification control portion to the armature winding of the second stator to generate a magnetic flux for weakening or reinforcing the magnetic flux generated by the permanent magnet of the rotor.

According to the present invention, when there is no field current supplied by the electrification control portion to the armature winding of the second stator to generate a magnetic flux for weakening or reinforcing the magnetic generated flux by the permanent magnet of the rotor, the armature winding of the second stator and the power drive circuit of the armature winding of the second stator is switched to the disconnected state by the switcher. According thereto, the armature winding of the second stator is supplied with no field current, thus, the electrification amount of the armature winding of the second stator is zero, and consequently, the supplied power to the motor can be reduced.

In the present invention, the controller for the motor further includes a revolution number detection portion configured to detect a revolution number of the motor, wherein the electrification control portion, on a condition when the terminal voltage of the armature winding of the first stator is equal to or greater than the defined value as the rotor is revolving and the revolution number of the motor is equal to or greater than a defined revolution number, forms the power drive circuit of the second stator, and switches off both a first switching element disposed at each phase of the second stator for connecting or disconnecting an input portion of the armature winding of each phase to a high potential side and a second switching element disposed at each phase of the second stator for connecting or disconnecting the input portion of the armature winding of each phase to a low potential side, or switches on each of the first switching elements and switches off each of the second switching elements, or switches off each of the first switching elements and switches on each of the second switching elements.

According to the present invention, details thereof will be described hereinafter, when the terminal voltage of the armature winding of the first stator is equal to or greater than the defined value as the rotor is revolving and the revolution number of the motor is equal to or greater than a defined revolution number, the electrification control portion sets each of the first switching elements to the ON state and each of the second switching elements to the OFF state, or sets each of the first switching elements to the OFF state and each of the second switching elements to the ON state. According thereto, similar to the case where the field current is supplied to the armature winding of the second stator, the magnetic flux generated by the permanent magnet of the rotor can be weakened due to a flowing current driven by the induced voltage which is induced by the armature winding of the second stator. Thereby, the supplied power to the motor can be reduced.

In the present invention, the controller for the motor further includes a first power source configured to supply the torque current to the armature winding of the first stator and a second power source configured to supply the field current to the armature winding of the second stator separately, wherein an output voltage of the second power source is configured lower than that of the first power source.

According to the present invention, the armature winding of the second stator is supplied with the field current which is relative small to weaken or reinforce the magnetic flux generated by the permanent magnet of the rotor but with no great current to revolve the rotor. Therefore, the output voltage of the second power source can be set lower than that of the first power source. According thereto, the second power source, the armature winding of the second stator and the power drive circuit of the armature winding of the second stator can be made to endure a lower voltage only, and consequently, it is possible to simplify an insulation configuration thereof, which contributes to a compact size and cost reduction.

In the present invention, a wired number of the armature windings (turns of the windings) of the first stator is configured to be less than that of the armature winding of the second stator.

According to the present invention, the armature winding of the first stator can generate a greater torque according to the supplied torque current. In regarding to the armature winding of the second stator, the effect of reinforcing and weakening the magnetic flux generated by the rotor can be improved according to the supplied field current.

In the present invention, a cross-sectional area of a magnetic circuit of the first stator is configured identical to that of the second stator.

According to the present invention, since the resistance of the magnetic circuits of the first stator and that of the second stator are substantially identical, the effect of reinforcing and weakening the magnetic flux generated by the permanent magnet of the rotor can be improved according to the supplied field current to the armature winding of the second stator.

DETAILED DESCRIPTION OF THE PREFERRED EMBODIMENTS

Hereinafter, an embodiment of the present invention will be described in detail with reference to FIG. 1 to FIG. 6.

Figure 1:
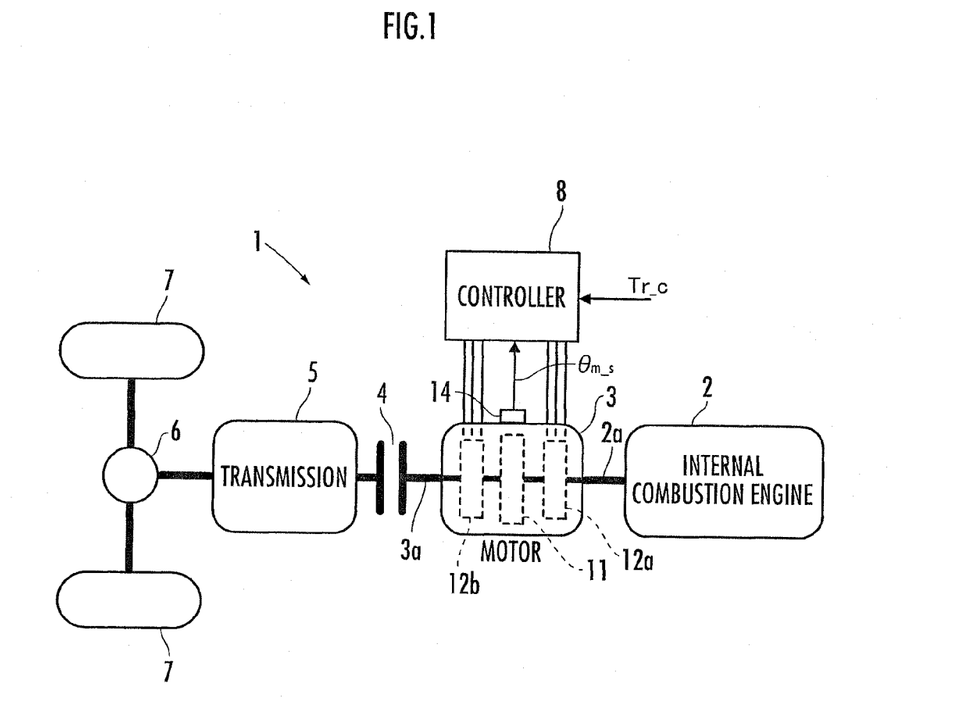
FIG. 1 is a structural diagram of a vehicle mounted with a controller for a motor of the present invention.
Figure 2:
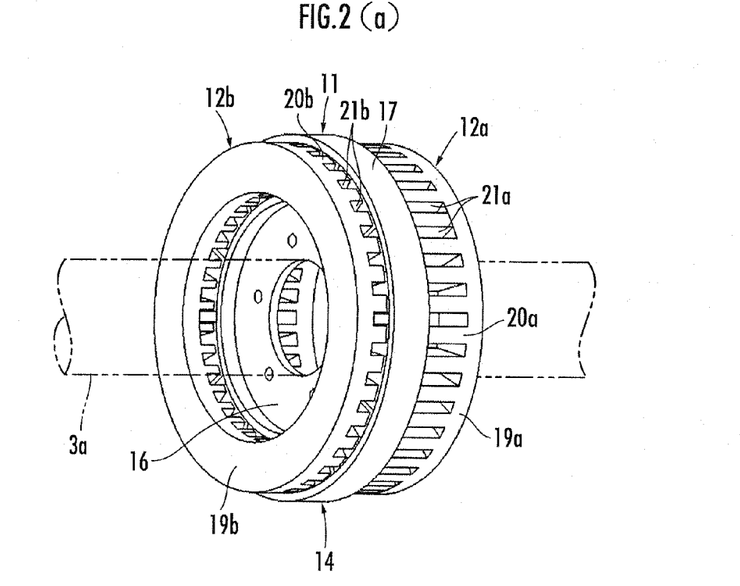
FIG. 2 is an explanatory diagram illustrating the structure of an axial gap-type motor.

With reference to FIG. 1, an overall structure of a vehicle mounted with a motor of the present embodiment will be described. FIG. 1 illustrates the overall structure of the vehicle.

The vehicle 1 of the present embodiment is a hybrid vehicle of a parallel type and is provided with an internal combustion engine 2 serving as a main driving force generation source and a motor 3 serving as an auxiliary driving force generation source. The motor 3, to be described hereinafter, is an axial gap-type motor having a rotor 11, a first stator 12a and a second stator 12b. The motor 3 is provided with a resolver 14 serving as a revolution angle detection portion configured to detect a revolution angle of the rotor 11.

An output shaft 2a of the internal combustion engine 2 is coaxially and directly coupled with a revolution shaft 3a revolutionarily integrated with the rotor 11 of the motor 3. It is acceptable to connect the output shaft 2a of the internal combustion engine 2 with the revolution shaft 3a of the motor 3 through the intermediary of a power transmission device such as a reduction gear or the like. The output shaft 2a and the revolution shaft 3a are connected to an input side of a transmission 5 through the intermediary of a crutch 4. An output side of the transmission 5 is connected with driving wheels 7 and 7 of the vehicle 1 through the intermediary of a differential gear unit 6.

In the vehicle 1, an output torque from the internal combustion engine 2, or a sum torque of the output torque from the internal combustion engine 2 and an output torque (power running torque) from the motor 3 is transferred to the driving wheels 7 and 7 as the driving force for the vehicle 1 through the crutch 4, the transmission 5 and the differential gear unit 6. According thereto, the moving of the vehicle 1 is enabled. Note that the motor 3 may generate energy by using kinetic energy of the vehicle 1 transferred to the motor 3 from the driving wheels 7 and 7 and perform regenerative driving by charging an accumulator (not shown) which is served as a power source for the motor 3 with the generated energy. The regenerative torque generated by the motor 3 in the regenerative driving functions as a braking force for the vehicle 1.

The vehicle 1 is provided with a controller 8 configured to perform an operation control on the motor 3. To the controller 8, a detection value θm_s of a revolution angle of the rotor 11 from the resolver 14 and a torque command value Tr_c which is a required output torque of the motor 3 are input. The torque command value Tr_c is determined by a vehicular driving control device (not shown) which performs a total driving control on the vehicle 1 according to an operation amount of an accelerator pedal, an operation amount of a braking pedal, vehicular velocity or the like of the vehicle 1.

Thereafter, the controller 8 controls electrification currents to the armature windings of the first stator 12a and the second stator 12b so as to generate from the motor 3 the output torque which is equivalent to the torque command value Tr_c.

Perspective views of a structure of the rotor 11, the first stator 12a and the second stator 12b of the motor 3 are illustrated in FIG. 2(a) and FIG. 2(b). FIG. 2(a) illustrates the rotor 11, the first stator 12a and the second stator 12b in an assembled state of the motor 3, and FIG. 2(b) illustrates the rotor 11, the first stator 12a and the second stator 12b in an exploded state of the motor 3.

The rotor 11 is composed of a frame body 14 made from a non-magnetic material, and a plurality of permanent magnets 15 assembled in the frame body 14. The frame body 14 is integrated with a base body 16 of a circular plate shape, a circular ring body 17, and a plurality of partition plates 18. The ring body 17 is disposed to be coaxial with the base body 16, having a distance existed from an inner circumferential surface thereof to an outer circumferential surface of the base body 16 in the radial direction. The base body 16 and the ring body 17 are joined together by the plurality of partition plates 18. As illustrated in FIG. 2(a) with dash-dot lines, a revolution shaft 3a is attached to the base body 16 coaxially.

The plurality of partition plates 18 are extended radiantly from the outer circumferential surface of the base body 16 to the inner circumferential surface of the ring body 17 and arrayed at an equiangular interval around the axial center of the rotor 11. To a space enclosed by the outer circumferential surface of the base body 16, the inner circumferential surface of the ring body 17 and two adjacent partition plates 18 and 18 in the circumferential direction of the rotor 11, the permanent magnet 15 having an identical shape (fan-shaped plate) to that of the enclosed space is embedded. Thereby, the plurality of permanent magnets 15 are arrayed at an equiangular interval around the axial center of the rotor 11 between the base body 16 and the ring body 17.

One surface of each permanent magnet 15 in the width direction thereof (axial direction of revolution of the rotor 11) is N magnetic pole and the other surface thereof is S magnetic pole. The magnetic poles in the width direction on the same side surface of two adjacent permanent magnets 15 and 15 in the circumferential direction of the rotor 11, as denoted on each permanent magnet 15 in FIG. 2(b), are different from each other. In other words, the plurality of permanent magnets 15 included in the rotor 11 are such arrayed that directions of magnetic fluxes from two adjacent permanent magnets 15 and 15 in the circumferential direction of the rotor 11, namely the axial direction of revolution of the rotor 11, are different from each other. In the illustrated example, the number of the permanent magnets 15 is twelve, thus, the paired pole number of the rotor 11 is six.

In addition, one surface and the other surface in the axial direction of revolution of the rotor 11 may be disposed with separate permanent magnets.

The first stator 12a and the second stator 12b are of identical structure except that the widths thereof are different. As illustrated in FIG. 2(b), the first stator 12a includes a ring-shaped base body 19a and a plurality of teeth 20a. The plurality of teeth 20a are extended from one end surface of two end surfaces of the base body 19a in the axial direction of the base body 19a and are arrayed at an equiangular interval around the axial center of the base body 19a. Similarly, the second stator 12b includes a ring-shaped base body 19b and a plurality of teeth 20b. The plurality of teeth 20b are extended from one end surface of two end surfaces of the base body 19b in the axial direction of the base body 19b and are arrayed at an equiangular interval around the axial center of the base body 19b. The base body 19a and the teeth 20a, and the base body 19b and the teeth 20b are both made from magnetic materials. In the illustrated example, the numbers of the teeth 20a on the first stator 12a and the numbers of the teeth 20b on the second stator 12b are both thirty-six.

Figure 3:
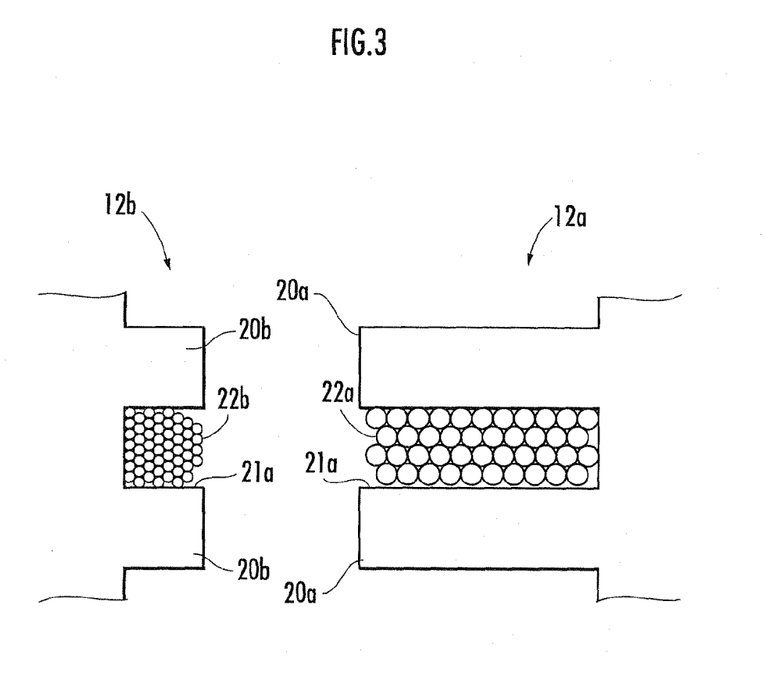
FIG. 3 is an explanatory diagram illustrating armature windings mounted in a first stator and a second stator.

FIG. 3 illustrates cross-sectional views of the first stator 12a and the second stator 12b. As illustrated in FIG. 2(b) and FIG. 3, a slot 21a, which is a groove between two adjacent teeth 20a and 20a in the circumferential direction, is mounted with the armature winding 22a. Similarly, a slot 21b, which is a groove between two adjacent teeth 20b and 20b in the circumferential direction, is mounted with the armature winding 22b.

In the present embodiment, the armature winding 22a mounted in the first stator 12a and the armature winding 22b mounted in the second stator 12b have three phases (U phase, V phase and W phase). The mounting way of the armature winding 22a in the first stator 12a is identical to that of the armature winding 22b in the second stator 12b.

For example, when the armature winding 22a of each phase of the first stator 12a is viewed in the axial direction of the first stator 12a, it is looped with the same number as that of the permanent magnets 15 of the rotor 11 in the first stator 12a at an equiangular interval in the circumferential direction of the first stator 12a. Similar way is applied to the armature winding 22b in the second stator 12b.

Moreover, the winding pattern of the armature winding 22a in the first stator 12a is identical to that of the armature winding 22b in the second stator 12b. However, the wired number (turns) of the armature winding 22a of the first stator 12a is configured to be less than that of the armature winding 22b of the second stator 12b. According thereto, the AC impedance in the armature winding 22a of the first stator 12a is reduced, resulted in a larger electrification amount, and thereby, the output torque of the motor 3 is increased. On the other hand, the magnetic flux is increased by the armature winding 22b of the second stator 12b when an electric current is supplied thereto, and thereby, the electrification amount necessary to a field control to be described hereinafter is reduced.

The diameter of the armature winding 22a of the first stator 12a is greater than that of the armature winding 22b of the second stator 12b, and thereby, the second stator 12b becomes thinner than the first stator 12a.

As illustrated in FIG. 2(a), the first stator 12a and the second stator 12b in the assembled state of the motor 3 sandwiches the rotor 11 therebetween. The first stator 12a and the second stator 12b are disposed coaxially at both sides of the rotor 11 in the axial direction and fixed at a housing (not shown) of the motor 3. Top end surfaces of the teeth 20a of the first stator 12a and the teeth 20b of the second stator 12b are close to the rotor 11 and are opposite to each other.

In the present embodiment, the first stator 12a and the second stator 12b are assembled in the motor 3 in such a way that the position of each tooth 20a of the first stator 12a (angular position around the axle) matches the position of each tooth 20b of the second stator 12b (angular position around the axle) when viewed from the axial direction of revolution of the rotor 11 in the assembled state of the motor 3.

In other words, the individual tooth 20a of the first stator 12a and the individual tooth 20b of the second stator 12b are assembled opposite to each other in the axial direction of revolution of the rotor 11. The armature winding 22a of each phase of the first stator 12a and the armature winding 22b of the second stator 12b of the same phase as the armature winding 22a are mounted in the first stator 12a and the second stator 12b, respectively, in such a way that the winding loops of the armature winding 22a of the first stator 12a and the winding loops of the armature winding 22b of the second stator 12b are opposite to each other every phase in the axial direction of revolution of the rotor 11 (when viewed from the axial direction of revolution of the rotor 11, the winding loops at the first stator 12a side and the winding loops at the second stator 12b side are located at the same angular positions, respectively).

Thereby, the armature winding 22a of a phase of the first stator 12a and the armature winding 22b of the same phase of the second stator 12b is electrified with a current of the same phase, for every phase, the magnetic flux generated from the armature winding 22a of the first stator 12a and the magnetic flux generated from the armature winding 22b of the second stator 12b reinforce each other to the maximum in the axial direction of revolution of the rotor 11. In the present embodiment, except the difference on thickness, the first stator 12a and the second stator 12b have the same structure, thus, the cross-sectional area of the magnetic circuit (cross-sectional area of the magnetic path) of the first stator 12a and the second stator 12b of each phase are identical to each other.

Figure 4:
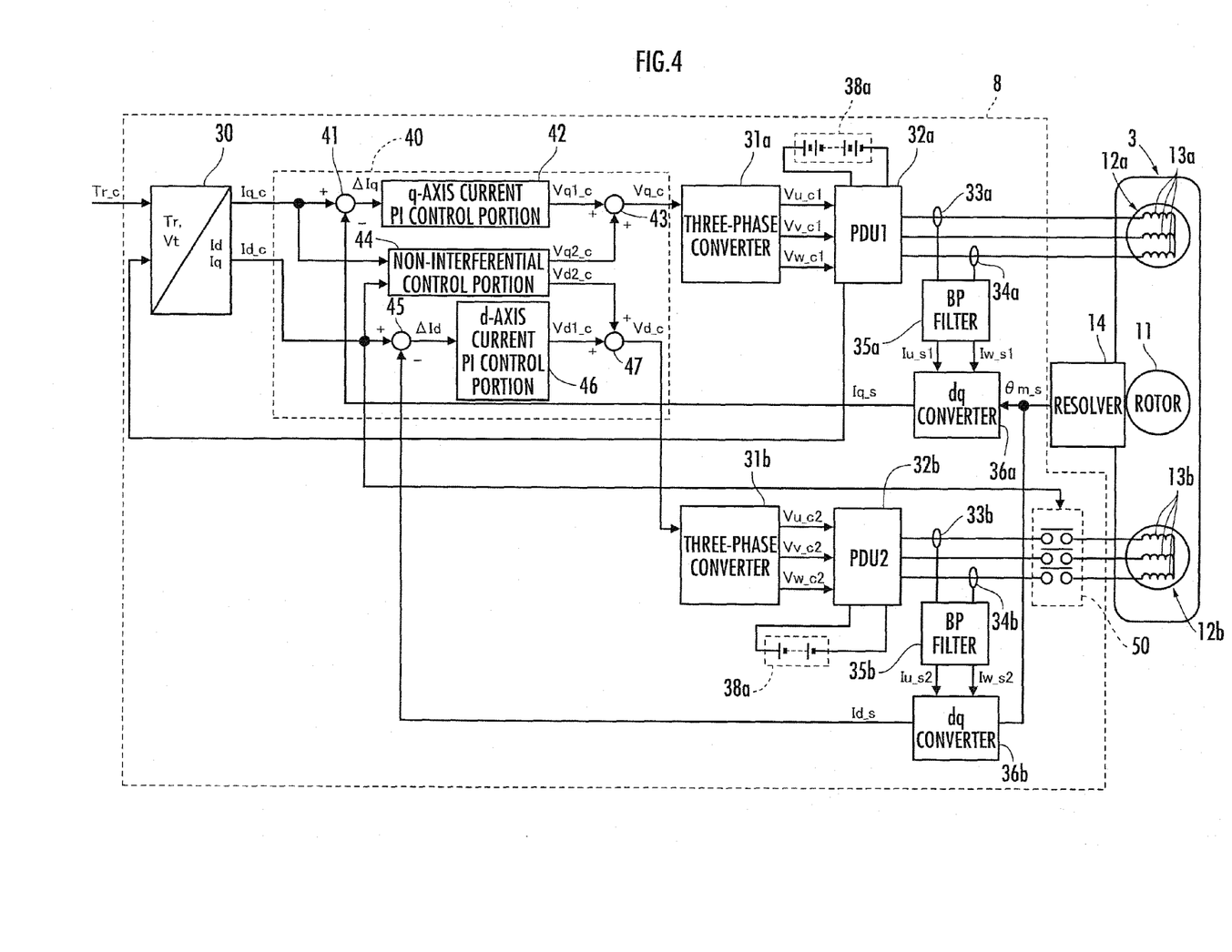
FIG. 4 is block diagram illustrating a functional structure of the controller for the motor.

Hereinafter, the detailed configuration of the controller 8 will be described with reference to FIG. 4. FIG. 4 is a block view illustrating a functional configuration of the controller 8. The controller 8 is composed of an electronic circuit unit including a micro computer and the like. In the following description, as illustrated in FIG. 4, a reference number 13a will be used to denote the armature winding of each phase mounted in the first stator 12a, and a reference number 13a for the armature winding 13b of each phase mounted in the second stator 12b.

First, a control processing by the controller 8 performed on the motor 3 will be outlined. In the present embodiment, an electrification current (phase current) in the armature winding 13a of each phase of the first stator 12a of the motor 3 and the armature winding 13b of each phase of each second stator 12b of the motor 3 are controlled according to a so-called d-q vector control. In other words, the controller 8 handles the motor 3 by converting it into an equivalent circuit of 2-phase direct currents in a d-q coordinate system.

The equivalent circuit has an armature at d axis (hereinafter, referred to as a d-axis armature) and an armature at q axis (hereinafter, referred to as a q-axis armature). The d-q coordinate system is a rotational coordinate system which rotates integrally with the rotor 11 of the motor 3 having a magnetic field direction of the permanent magnet 15 of the rotor 11 as the d axis and a direction orthogonal to the d axis as the q axis.

In the d-q vector control, the output torque of the motor 3 can be controlled by adjusting an electrification amount to the q-axis armature. Moreover, by adjusting an electrification amount to the d-axis armature, a control for reinforcing the magnetic flux generated by the permanent magnet 15 of the rotor 11 (magnetic field reinforcing control) and a control for weakening the magnetic flux generated by the permanent magnet 15 of the rotor 11 (magnetic field weakening control) can be fulfilled. The controller 8 performs the d-q vector control by using the armature winding 13a of the first stator 12a as the winding of the q-axis armature and the armature winding 13b of the second stator 12b as the winding of the d-axis armature.

The controller 8 controls each phase current in the armature winding 13a of the first stator 12a of the motor 3 and in the armature winding 13b of the second stator 12b of the motor 3 so as to make the revolution shaft 3a of the motor 3 generate a torque equivalent to the torque command torque Tr_c inputted externally.

The controller 8 includes, as a functional configuration thereof, a current command determining portion 30 configured to determine a q-axis current command value Iq_c, which is a command value of a current in the q-axis armature (corresponds to a torque current of the present invention and will be referred to the q-axis current hereinafter), and a d-axis current command value Id_c, which is a command value of a current in the d-axis armature (corresponds to a field current of the present invention and will be referred to the d-axis current hereinafter).

The current command determining portion 30 determines the q-axis current command value Iq_c and the d-axis current command value Id_c by applying the torque command value Tr_c to a correlation map defined according to preliminary experiments, computer simulation or the like. In the correlation map, an output torque Tr of the motor 3 and a terminal voltage Vt of the armature winding 13a of the first stator 12a are correlated to the d-axis current Id and the q-axis current Iq, respectively. The data of the correlation map are stored in a memory (not shown) of the controller 8.

The controller 8 is further provided with a current control portion 40 which defines a d-axis voltage command value Vd_c, a command value of a voltage on the windings of the d-axis armature (referred to as d-axis voltage hereinafter), and a q-axis voltage command value Vq_c, a command value of a voltage on the windings of the q-axis armature (referred to as q-axis voltage hereinafter) according to the q-axis current command value Iq_c and the d-axis current command value Id_c, respectively.

Further, the controller 8 is provided with current sensors 33a and 34a, a BP (band pass) filter 35a, and a dq converter 36a. The current sensors 33a and 34a are served as current detecting portions configured to detect respectively phase currents in two armature winding 13a and 13a of two phases, for example, U phase and W phase, among the armature windings 13a, 13a and 13a of 3 phases in the first stator 12a. The BP filter 35a is a band-pass filter to remove noise components from the outputs from the current sensors 33a and 34a. The dq converter 36a calculates a q-axis current detection value (estimated value) Iq_s from a current detection value Iu_s1 of the U-phase armature winding 13a and a current detection value Iw_s1 of the W-phase armature winding 13a of the first stator 12a, which are obtained by passing the outputs from the current sensors 33a and 34a through the BP filter 35a.

In detail, the dq converter 36a calculates the q-axis current detection value Iq_s by performing a coordinate conversion on the current detection value Iu_s1 of the U-phase armature winding 13a, the current detection value Iw_s1 of the W-phase armature winding 13a of the first stator 12a, and a calculated current detection value Iv_s1 of the V-phase armature winding 13a (Iv_s1=−Iu_s1−Iw_s1) in accordance with an electric angle θe (which is calculated by multiplying an anti-pole number of the rotor 11 by the detection value θm_s of a revolution angle of the rotor 11 by the resolver 14) according to the following equation (1).

Equation (1)

$$\begin{bmatrix} \text{Id\_s} \\ \text{Iq\_s} \end{bmatrix} = \sqrt{\frac{2}{3}} \cdot A(\theta e) \cdot \begin{bmatrix} \text{Iu\_s1} \\ \text{Iv\_s1} \\ \text{Iw\_s1} \end{bmatrix} \quad (1)$$

wherein, $$A(\theta e) = \begin{bmatrix} \cos\theta e & \cos\left(\theta e - \frac{2}{3}\pi\right) & \cos\left(\theta e + \frac{2}{3}\pi\right) \\ -\sin\theta e & -\sin\left(\theta e - \frac{2}{3}\pi\right) & -\sin(\theta e) + \frac{2}{3}\pi \end{bmatrix}$$

Furthermore, the controller 8 is provided with current sensors 33b and 34b, a BP (band pass) filter 35b, and a dq converter 36b. The current sensors 33b and 34b are configured to detect respectively phase currents in two armature winding 13b and 13b of two phases, for example, U phase and W phase, among the armature windings 13b, 13b and 13b of 3 phases in the second stator 12b. Similarly, the dq converter 36b calculates a d-axis current detection value (estimated value) Id_s according to the equation (1) from a current detection value Iu_s2 of the U-phase armature winding 13b and a current detection value Iw_s2 of the W-phase armature winding 13b of the second stator 12b, which are obtained by passing the outputs from the current sensors 33b and 34b through the BP filter 35b.

The current control portion 40 includes a subtraction portion 41, a q-axis current PI control portion 42, a subtraction portion 45, a d-axis current PI control portion 46, and a non-interferential control portion 44. The subtraction portion 41 is configured to obtain a deviation ΔIq between the q-axis current command value Iq_c and the q-axis current detection value Iq_s (ΔIq=Iq_c−Iq_s). The q-axis current PI control portion 42 is configured to calculate a basic command value Vq1_c of the q-axis voltage so as to resolve the deviation ΔIq (approximate the deviation to zero) according to the feedback control based on PI (Proportional-Integral) control rule. The subtraction portion 45 is configured to obtain a deviation ΔId between the d-axis current command value Id_c and the d-axis current detection value Id_s (ΔId=Id_c−Id_s). The d-axis current PI control portion 46 is configured to calculate a basic command value Vd1_c of the d-axis voltage so as to resolve the deviation ΔId (approximate the deviation to zero) according to the feedback control based on PI (Proportional-Integral) control rule. The non-interferential control portion 44 is configured to obtain a correction amount Vq2_c of the q-axis voltage and a correction amount Vd2_c of the d-axis voltage for counteracting a velocity electromotive force interfering mutually between the d axis and the q axis.

The non-interferential control portion 44 calculates the correction amount Vq2_c for q-axis from the d-axis current command value Id_c and the rotor angular velocity (which is calculated by differentiating the detection value θm_s of the rotor angle), and the correction amount Vd2_c for d-axis from the q-axis current command value Iq_c and the rotor angular velocity.

Furthermore, the current control portion 40 includes a summation portion 43 configured to obtain a final q-axis voltage command value Vq_c by adding the correction amount Vq2_c to the basic command value Vq1_c of the q-axis voltage, and a summation portion 47 configured to obtain a final d-axis voltage command value Vd_c by adding the correction amount Vd2_c to the basic command value Vd1_c of the d-axis voltage.

The controller 8 further includes a 3-phase converter 31a, a first PDU (Power Drive Unit) 32a, and a battery 38a (equivalent to a first power source of the present invention). The 3-phase converter 31a is configured to obtain phase voltage command values Vu_c1, Vv_c1 and Vw_c1 of the armature winding 13a of U phase, V phase and W phase, respectively, of the first stator 12a from the q-axis voltage command value Vq_c. The first PDU 32a is configured to electrify the armature winding 13a of each phase in the first stator 12a according to the phase voltage command values Vu_c1, Vv_c1 and Vw_c1. The battery 38a supplies electric power to the first PDU 32a.

In addition, the first PDU 32a has a function (the configuration to fulfill the function corresponds to a terminal voltage detection portion of the present invention) as to detect a terminal voltage Vt of the armature winding 13a of the first stator 12a and the detection value of the terminal voltage Vt is input to the current command determining portion 30.

The 3-phase converter 31a calculates the phase voltage command values Vu_c1, Vv_c1 and Vw_c1 by performing the coordinate conversion on the q-axis voltage command value Vq_c in accordance with the electric angle θe of the rotor 11 according to the following equation (2). Note that the $A(\theta e)^T$ in the equation (2) is a transverse matrix of matrix A(θe) defined in the equation (1).

Equation (2)

$$\begin{bmatrix} \text{Vu\_c1} \\ \text{Vv\_c1} \\ \text{Vw\_c1} \end{bmatrix} = \sqrt{\frac{2}{3}} \cdot A(\theta e)^T \cdot \begin{bmatrix} \text{Vd\_c1} \\ \text{Vq\_c1} \end{bmatrix} \quad (2)$$

The controller 8 further includes a 3-phase converter 31b, a second PDU 32b, and a battery 38b (equivalent to a second power source of the present invention). The 3-phase converter 31b is configured to obtain phase voltage command values Vu_c2, Vv_c2 and Vw_c2 of the armature winding 13b of U phase, V phase and W phase, respectively, of the second stator 12b from the d-axis voltage command value Vd_c according the equation (2) in a similar way. The second PDU 32b is configured to electrify the armature winding 13b of each phase in the second stator 12b according to the phase voltage command values Vu_c2, Vv_c2 and Vw_c2. The battery 38b supplies electric power to the second PDU 32b.

The current command determining portion 30, included with the current control portion 40, 3-phase converter 31a, the first PDU 32a, the current sensors 33a and 34a, the band pass filter 35a, the dq converter 36a, the 3-phase converter 31b, the second PDU 32b, the current sensors 33b and 34b, the band pass filter 35b and the dq converter 36b, constitutes the electrification control portion of the present invention.

According to the correlation map in the current command determining portion 30, on a condition when the terminal voltage Vt of the armature winding 13a of the first stator 12a is equal to or greater than a given voltage defined on the basis of the output voltage of the first power source 38a, the d-axis current command value Id_c is set negatively (−), and according thereto, there is performed the field weakening control in which a magnetic flux is generated from the armature winding 13b of the second stator 12b to weaken the magnetic flux generated by the permanent magnet 15 of the rotor 11. Moreover, according to the correlation map, on a condition when the torque command value Tr_c is equal to or greater than a given value, the d-axis current command value Id_c is set positively (+), and according thereto, there is performed the field reinforcing control in which a magnetic flux is generated from the armature winding 13b of the second stator 12b to reinforce the magnetic flux generated by the permanent magnet 15 of the rotor 11.

As described, the controller 8 controls the operation of the motor 3 by taking the armature winding 13a of the first stator 12a as the d-axis armature winding and the armature winding 13b of the second stator 12b as the q-axis armature winding. It is possible to configure the first stator 12a for torque control and the second stator 12b for field control independently.

Herein, it is necessary to supply a relatively great current to the armature winding 13a of the first stator 12a in order to revolve the rotor 11; however, the armature winding 13b of the second stator 12b is only needed to be supplied a relative small current so as to perform the field weakening control and the field reinforcing control on the permanent magnet 15 of the rotor 11.

In the present embodiment, the output voltage of the battery 38b configured to supply power to the second PDU 32b for the second stator 12b is set lower than that of the battery 38a configured to supply power to the first PDU 32a for the first stator 12a. According thereto, it is possible to set lower a withstand voltage for the battery 38b, the second PDU 32b, the current sensors 33b and 34b, and the armature winding 13b of the second stator 12b, respectively, and consequently, it is expected to reduce the size and cost thereof, respectively.

The controller 8 further includes a switcher 50 configured to switch over a connected state and a disconnected state between the second PDU 32b and the armature winding 13b of the second stator 12b. On a condition when the d-axis current command value Id_c is zero, the switcher 50 switches off to set the second PDU 32b and the armature winding 13b of the second stator 12b to the disconnected state. According thereto, when the d-axis current is zero, it is not necessary to supply power to the armature winding 13b of the second stator 12b; therefore, it is able to reduce the electric power consumed by the motor 3.

Figure 5:
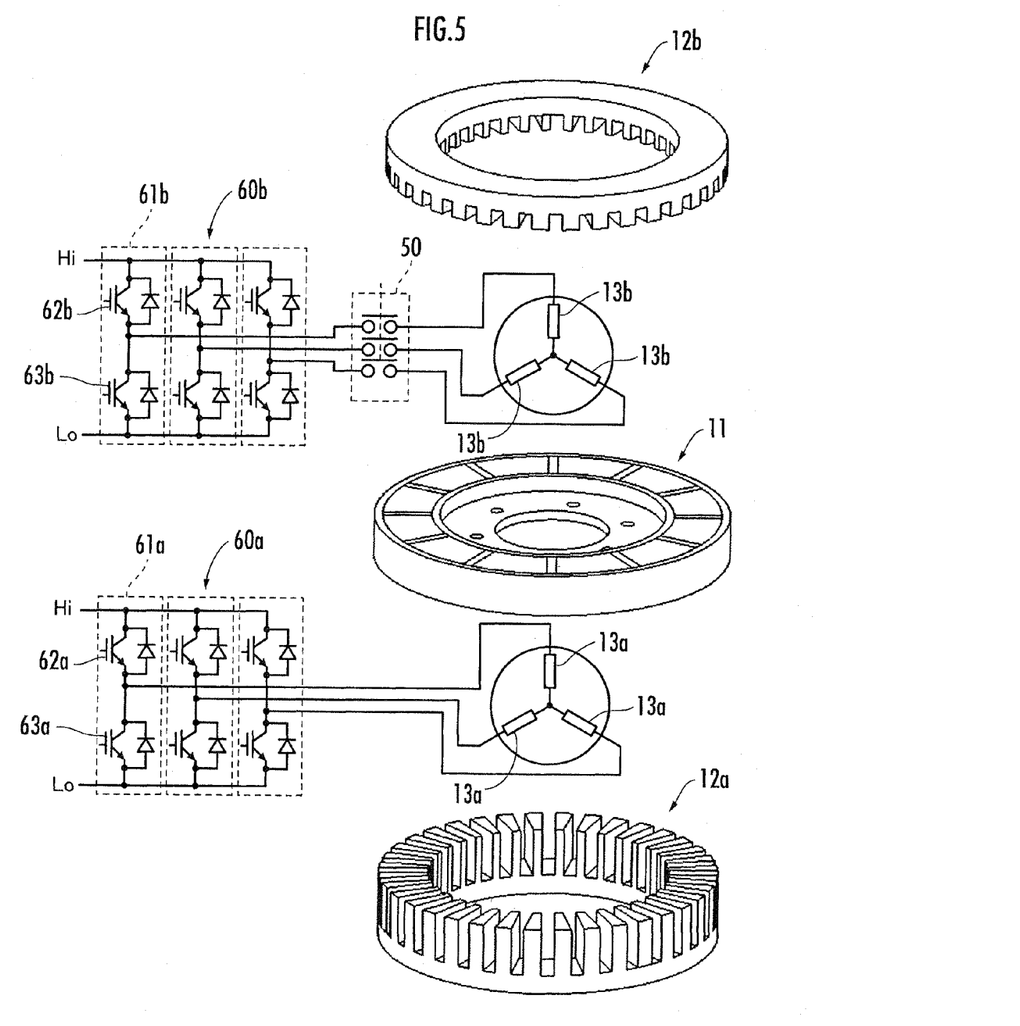
FIG. 5 is a structural diagram of a power drive circuit of the motor.

FIG. 5 illustrates configurations of an inverter 60a provided in the first PDU 32a and an inverter 60b provided in the second PDU 32b. The first PDU 32a includes the inverter 60a. The switching circuit 61a has a transistor 62a and a transistor 63b. The transistor 62a is configured to switch over a connected state and a disconnected state between the input portion of the armature winding 13a of each phase of the first stator 12a and the high potential side (denoted with a symbol Hi in the drawing). The transistor 63b is configured to switch over the connected state and the disconnected state between the input portion of the armature winding 13a of each phase of the first stator 12a and the low potential side (denoted with a symbol Lo in the drawing). The inverter 60a is provided the switching circuit 61a in each armature winding 13a of each phase. Thereby, the first PDU 32a alters the electrification amount of each armature winding 13a by switching ON/OFF the transistors 62a and 63b of each switching circuit 61a according to the PWM control.

Similarly, the second PDU 32b is provided with a switching circuit 61b having a transistor 62b (equivalent to the first switching element of the present invention) for switching over a connected state and a disconnected state between the input portion of the armature winding 13b of each phase of the second stator 12b and the high potential side and a transistor 63b (equivalent to the second switching element of the present invention) for switching over a connected state and a disconnected state between the input portion of the armature winding 13b of each phase of the second stator 12b and the low potential side, and the inverter 60b provided the switching circuit 61b in each armature winding 13b of each phase.

According to the present embodiment, the second PDU 32b and the armature winding 13b of each phase are disconnected by switching OFF the switcher 50 of each phase among the switchers 50 when the d-axis command current Id_c is zero; however, the disconnected state can be fulfilled by switching OFF (gate off) all the transistors 62b and 63b of the inverter 60b without the need of providing the switcher 50, as illustrated in FIG. 5. Furthermore, when the revolution number of the motor 3 is greater than the given revolution number, it is acceptable to switch ON all the transistors 62b at the high potential side of the inverter 60b and OFF all the transistors 63b at the low potential side thereof, as illustrated in FIG. 5, or to switch ON all the transistors 63b at the low potential side of the inverter 60b and OFF all the transistors 62b at the low potential side thereof, namely to set the inverter 60b at a 3-phase short-circuit state.

Figure 6:
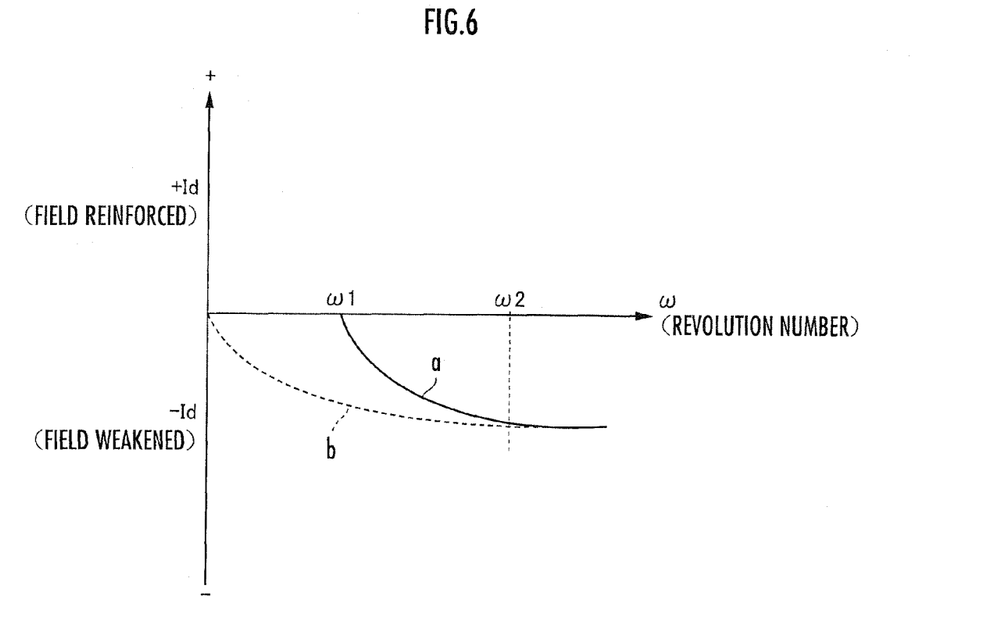
FIG. 6 is an explanatory diagram illustrating a comparison between a case where a field weakening control is performed and a case where 3-phase short circuit state is set.

FIG. 6 is a graph illustrating a relation between the field current and the revolution number $\omega$ of the motor 3, using the magnitude and direction of the field current supplied to the d-axis armature winding as a vertical axis and the revolution number $\omega$ of the motor 3 as a horizontal axis. As illustrated, the curve a represents the field weakening control for weakening the field by controlling the d-axis current supplied. Within a range of low revolution numbers ($\omega<\omega 1$), the current supplied to the armature winding 13b of the second stator 12b is controlled so that the d-axis current becomes zero (Id=0). When the revolution number $\omega$ of the motor 3 surpasses $\omega 1$, the d-axis current is increased subsequently. According thereto, a magnetic flux for weakening the magnetic flux generated by the permanent magnet of the rotor 11 is generated.

When the revolution number $\omega$ of the motor 3 is equal to or greater than $\omega 2$, the d-axis current becomes stable due to reasons that the field weakening control is performed and the 3-phase short-circuit state is set. When the revolution number $\omega$ of the motor 3 is in a range of high revolution numbers equal to or higher than $\omega 2$, it is possible to obtain the field weakening effect without the need of supplying the d-axis current by setting the armature winding 13b of the second stator 12b at the 3-phase short-circuit state.

The present embodiment describes the control on the operation of the axial gap-type motor provided in the hybrid vehicle which is performed the motor controller of the present invention. However, the present invention is applicable to an axial gap-type motor used in the other fields.

In the present embodiment, the output voltage of the second power source 38b for the second stator 12b is set lower than that of the first power source 38a of the first stator 12a. However, it is possible to obtain the same effect without such setting.

In the present embodiment, the wired number of the armature winding 13a of the first stator 12a is set less than that of the armature winding 13b of the second stator 12b. However, it is possible to obtain the same effect without such setting.

In the present embodiment, the cross-sectional area of the magnetic circuit of the first stator is set identical to that of the second stator. However, it is possible to obtain the same effect without such setting.

INDUSTRIAL APPLICABILITY

As above-mentioned, according to the controller for an motor of the present invention, the motor can be operated at a higher revolution velocity and a higher torque in a increased controllable range, thereby, the present invention is useful in the control of an axial gap-type motor.

What is claimed is:

1. A controller for an axial gap-type motor, comprising:
a rotor having a permanent magnet;
a first stator and a second stator oppositely disposed in an axial direction of revolution of the rotor with the rotor being interposed therebetween;
an electrification control portion configured to:
supply a torque current for generating a magnetic field to revolve the rotor to a first armature winding of the first stator, and a field current for reinforcing or weakening a magnetic flux generated by the permanent magnet of the rotor to a second armature winding of the second stator,
configure an equivalent circuit of two-phase direct currents for the motor in a d-q coordinate system having a d axis armature along a field direction of the rotor and a q axis armature orthogonal to the d axis, and
supply an electric current to the first armature winding at the q axis as the torque current and an electric current to the second armature winding at the d axis as the field current; and
a terminal voltage detection portion configured to detect a terminal voltage of the first armature winding of the first stator,
wherein the electrification control portion is further configured to supply the field current to the second armature winding of the second stator to weaken the magnetic flux generated by the permanent magnet of the rotor when the terminal voltage of the first armature winding of the first stator is equal to or greater than a defined value as the rotor is revolving.

2. The controller for the motor according to claim 1, wherein the electrification control portion supplies the field current to the second armature winding of the second stator for reinforcing the magnetic flux generated by the permanent magnet of the rotor when a required output torque of the motor is equal to or greater than a defined value.

3. The controller for the motor according to claim 1, further comprising a switcher configured to switch the second armature winding of the second stator and a power drive circuit of the second armature winding of the second stator between a connected state and a disconnected state, wherein
the switcher switches the second armature winding of the second stator and the power drive circuit of the second armature winding of the second stator to the disconnected state when no field current is supplied by the electrification control portion to the second armature winding of the second stator for weakening or reinforcing the magnetic flux generated by the permanent magnet of the rotor.

4. The controller for the motor according to claim 1, further comprising a revolution number detection portion configured to detect a revolution number of the motor, wherein
when the terminal voltage of the first armature winding of the first stator is equal to or greater than the defined value as the rotor is revolving and the revolution number of the motor is equal to or greater than a defined revolution number, the electrification control portion forms the power drive circuit of the second stator, and switches off both a first switching element disposed at each phase of the second stator for connecting or disconnecting an input portion of the second armature winding of each phase to a high potential side and a second switching element disposed at each phase of the second stator for connecting or disconnecting the input portion of the second armature winding of each phase to a low potential side, or switches on each of the first switching elements and switches off each of the second switching elements, or switches off each of the first switching elements and switches on each of the second switching elements.

5. The controller for the motor according to claim 1, further comprising a first power source configured to supply the torque current to the first armature winding of the first stator and a second power source configured to supply the field current to the second armature winding of the second stator separately, wherein
an output voltage of the second power source is configured to be lower than that of the first power source.

6. The controller for the motor according to claim 1, wherein a wired number of the first armature winding of the first stator is configured to be less than that of the second armature winding of the second stator.

7. The controller for the motor according to claim 1, wherein a cross-sectional area of a magnetic circuit of the first stator is configured to be identical to that of the second stator.

8. A controller for an axial gap-type motor, comprising:
a rotor having a permanent magnet;
a first stator and a second stator oppositely disposed in an axial direction of revolution of the rotor with the rotor being interposed therebetween;
a terminal voltage detection portion configured to detect a terminal voltage of a first armature winding of the first stator; and
an electrification control portion configured to:
supply a torque current for generating a magnetic field to revolve the rotor to the first armature winding of the first stator, and a field current for reinforcing or weakening a magnetic flux generated by the permanent magnet of the rotor to a second armature winding of the second stator, and
supply the field current to the second armature winding of the second stator to weaken the magnetic flux generated by the permanent magnet of the rotor when the terminal voltage of the first armature winding of the first stator is equal to or greater than a defined value as the rotor is revolving.

* * * * *